United States Patent
Martikainen et al.

(10) Patent No.: US 10,611,651 B2
(45) Date of Patent: Apr. 7, 2020

(54) ELECTRODE MODULE, ELECTROCHEMICAL REACTOR, AND WATER TREATMENT APPARATUS

(71) Applicant: OUTOTEC (FINLAND) OY, Espoo (FI)

(72) Inventors: Mika Martikainen, Espoo (FI); Mikko Karhu, Espoo (FI); Matti Luukkonen, Helsinki (FI); Niko Isomäki, Helsinki (FI); Tuomas Van Der Meer, Espoo (FI)

(73) Assignee: OUTOTEC (FINLAND) OY, Espoo (FI)

( * ) Notice: Subject to any disclaimer, the term of this patent is extended or adjusted under 35 U.S.C. 154(b) by 34 days.

(21) Appl. No.: 16/064,009

(22) PCT Filed: Dec. 21, 2016

(86) PCT No.: PCT/FI2016/050905
§ 371 (c)(1),
(2) Date: Jun. 20, 2018

(87) PCT Pub. No.: WO2017/109285
PCT Pub. Date: Jun. 29, 2017

(65) Prior Publication Data
US 2019/0010064 A1     Jan. 10, 2019

(30) Foreign Application Priority Data
Dec. 22, 2015   (FI) ..................................... 20155991

(51) Int. Cl.
*C02F 1/461*    (2006.01)
*C25B 11/02*    (2006.01)
(Continued)

(52) U.S. Cl.
CPC ...... *C02F 1/46109* (2013.01); *C02F 1/46104* (2013.01); *C25B 9/18* (2013.01);
(Continued)

(58) Field of Classification Search
CPC ................ C25D 17/007; C25D 17/008; C25D 17/10–17/14; C25C 7/02–7/025;
(Continued)

(56) References Cited

U.S. PATENT DOCUMENTS 1,501,692 A  *  7/1924  Ward ........................ C25B 9/04
                                                 204/288.2
3,581,470 A  *  6/1971  Aitkenhead ............... B03C 3/47
                                                   29/726
(Continued)

FOREIGN PATENT DOCUMENTS

GB      2440139 A      1/2008
GB      2449724 A      12/2008
(Continued)

OTHER PUBLICATIONS

English translation of abstract for JP 58-58291 (Year: 2018).*
(Continued)

*Primary Examiner* — Alexander W Keeling
(74) *Attorney, Agent, or Firm* — Robert P. Michal, Esq.; Carter, DeLuca & Farrell LLP

(57) ABSTRACT

An electrode module including electrode plates spaced from one another by spacing means, a plurality of support members each extending through each electrode plate and at least one spacing means between two adjacent electrode plates for releasable securing of the electrode plates together, and each electrode plate includes a plate portion. Each electrode plate includes one supporting and connection lug portion configured to support each electrode plate at a first busbar or a second busbar in an electrochemical reactor for electrically
(Continued)

connecting each electrode plate of the electrode module with a first busbar or a second busbar for supplying electrical current between one of the first busbar and the second busbar and each electrode plate of the electrode module.

21 Claims, 14 Drawing Sheets

(51) Int. Cl.
  *C25B 9/20* (2006.01)
  *C25B 11/04* (2006.01)
  *C25B 9/18* (2006.01)

(52) U.S. Cl.
  CPC ............... *C25B 9/20* (2013.01); *C25B 11/02* (2013.01); *C25B 11/04* (2013.01); *C25B 11/0473* (2013.01); *C02F 2001/46152* (2013.01); *C02F 2201/004* (2013.01); *C02F 2201/4616* (2013.01)

(58) Field of Classification Search
  CPC .............. C02F 1/46176; C02F 2201/46; C02F 2201/461; C02F 2201/46105; C02F 2201/4616; C02F 2001/46152; C02F 1/46104; C25B 9/00–9/20; C25B 11/00–11/0473
  USPC ......................................................... 204/288
  See application file for complete search history.

(56) References Cited

U.S. PATENT DOCUMENTS

| | | | |
|---|---|---|---|
| 3,977,951 A | 8/1976 | Lopez-Cacicedo | |
| 5,324,409 A * | 6/1994 | Mayr | C25C 7/00 204/267 |
| 9,630,863 B2 * | 4/2017 | McClean | C25B 11/02 |
| 2004/0251199 A1 | 12/2004 | Benavides | |
| 2006/0201586 A1 * | 9/2006 | Webb | C25C 7/02 148/325 |
| 2007/0205100 A1 * | 9/2007 | Casanova | C25C 7/02 204/280 |
| 2009/0152124 A1 * | 6/2009 | Ashford | C25C 1/12 205/574 |
| 2012/0160700 A1 * | 6/2012 | Wiedmeyer | C25C 3/34 205/477 |
| 2014/0042019 A1 | 2/2014 | Park et al. | |
| 2015/0027940 A1 * | 1/2015 | Lee | C02F 1/4672 210/192 |

FOREIGN PATENT DOCUMENTS

| | | | |
|---|---|---|---|
| JP | 58-58291 | * | 4/1983 |
| KR | 101488283 B1 | | 1/2015 |
| WO | WO-2014096549 A1 | | 6/2014 |
| WO | WO-2015176136 A1 | | 11/2015 |

OTHER PUBLICATIONS

International Search Report issued by the European Patent Office acting as the International Searching Authority in relation to International Application No. PCT/FI2016/050905 dated Mar. 30, 2017 (3 pages).

Written Opinion of the International Searching Authority issued by the European Patent Office acting as the International Searching Authority in relation to International Application No. PCT/FI2016/050905 dated Mar. 30, 2017 (5 pages).

International Preliminary Report on Patentability issued by the European Patent Office acting as the International Preliminary Examining Authority in relation to International Application No. PCT/FI2016/050905 dated Dec. 15, 2017 (6 pages).

Finnish Search Report issued by the Finnish Patent and Registration Office in relation to Finnish Application No. 20155991 dated Jun. 23, 2016 (2 pages).

* cited by examiner

ELECTRODE MODULE, ELECTROCHEMICAL REACTOR, AND WATER TREATMENT APPARATUS

CROSS-REFERENCE TO RELATED APPLICATIONS

This application is a national phase entry under 35 U.S.C. 371 of PCT International Application No. PCT/FI2016/050905 filed Dec. 21, 2016, which claims priority to Finnish Patent Application No. 20155991, filed Dec. 22, 2015, the disclosure of each of these applications is expressly incorporated herein by reference in their entirety.

FIELD OF THE INVENTION

The invention relates to an electrode module.

The invention also relates to an electrochemical reactor and to a water treatment apparatus comprising at least one electrode module.

Publication GB 2 449 724 presents an electrocoagulation cell with interleaved electrodes.

OBJECTS

An object of the invention is to provide an electrode module which allows for flexible change of electrode plates and which allows for flexible use of electrode plates of different materials in the electrode module to optimize performance.

BRIEF DESCRIPTION OF THE DRAWINGS

In the following the invention will described in more detail by referring to the figures, which

DETAILED DESCRIPTION OF THE INVENTION

Figure 1:
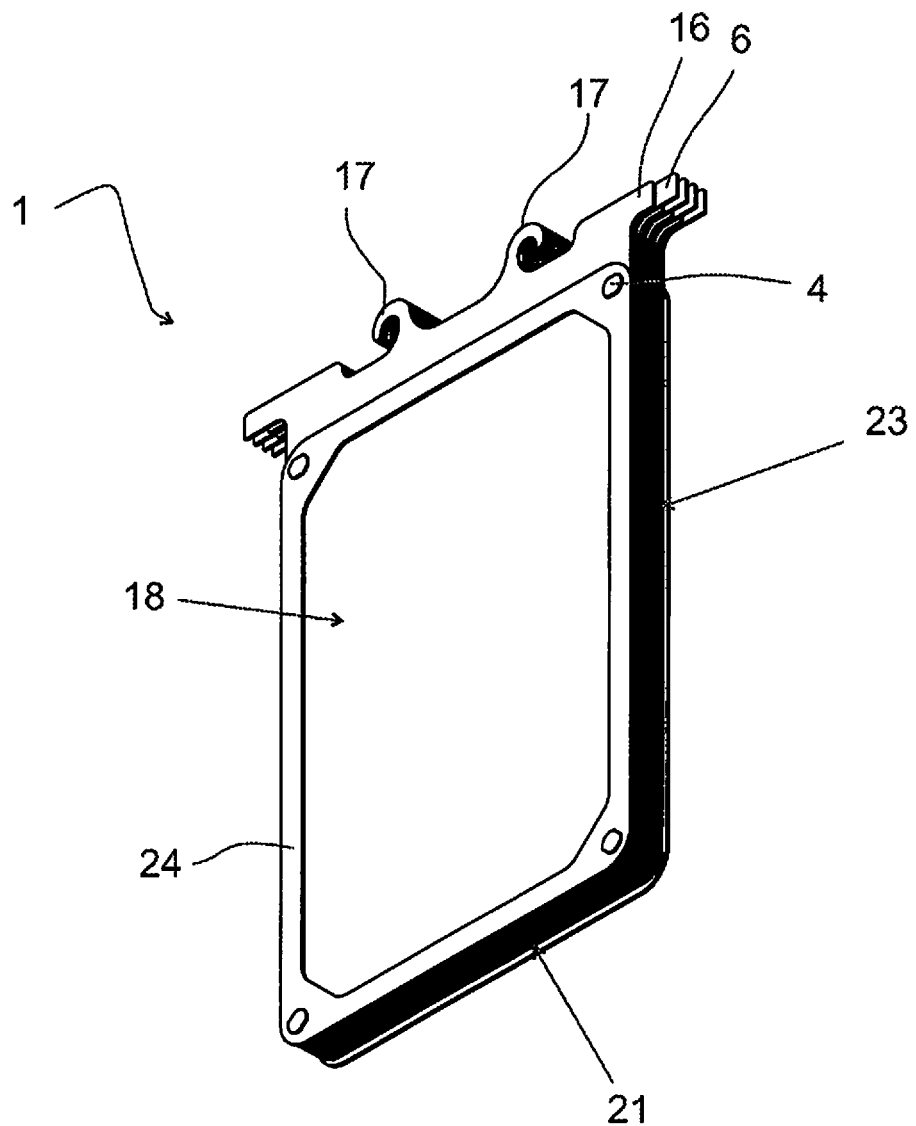
FIG. 1 shows an embodiment of the electrode module according.
Figure 2:
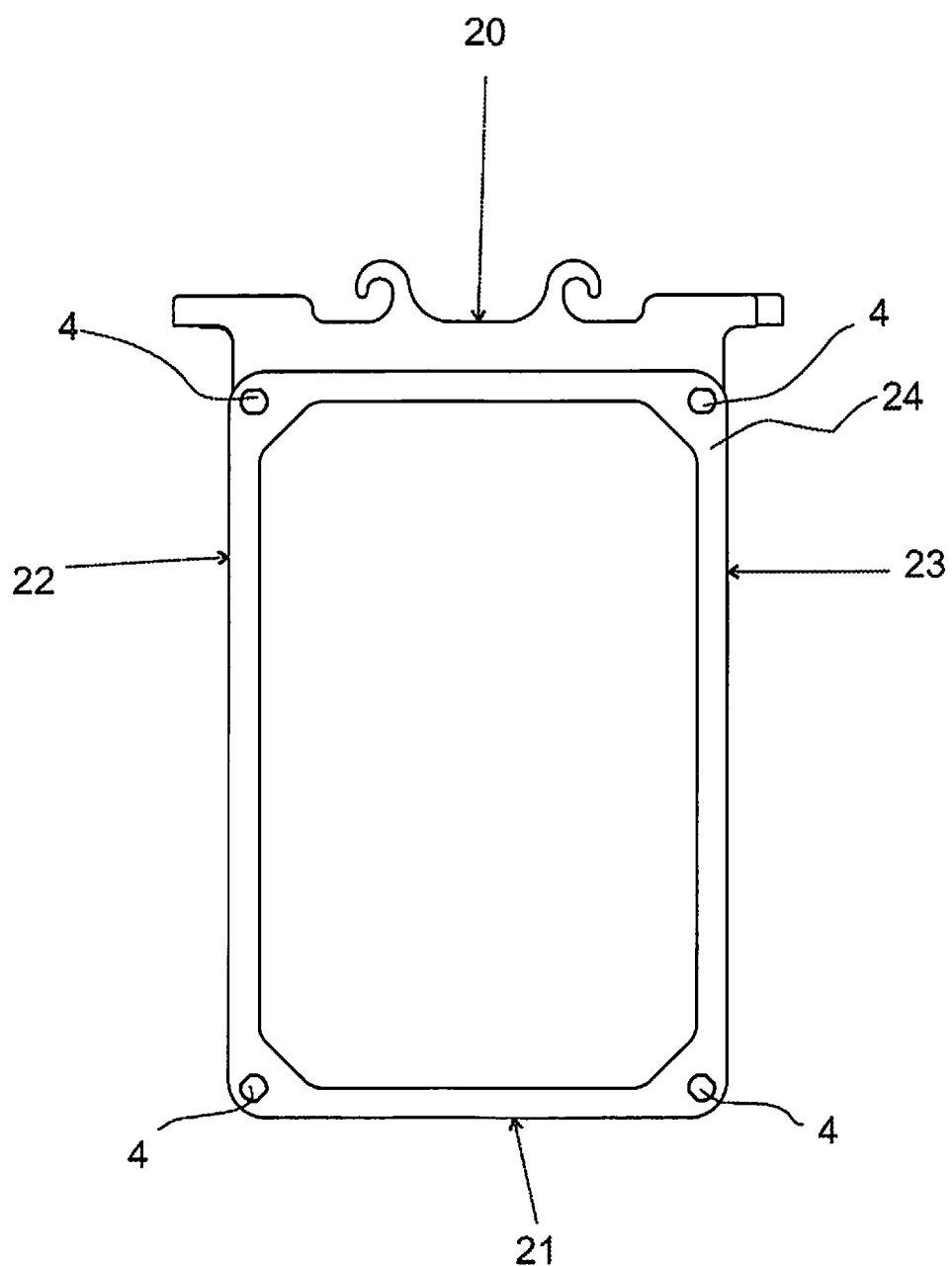
FIG. 2 shows the electrode module shown in FIG. 1 as shown from the first face.
Figure 3:
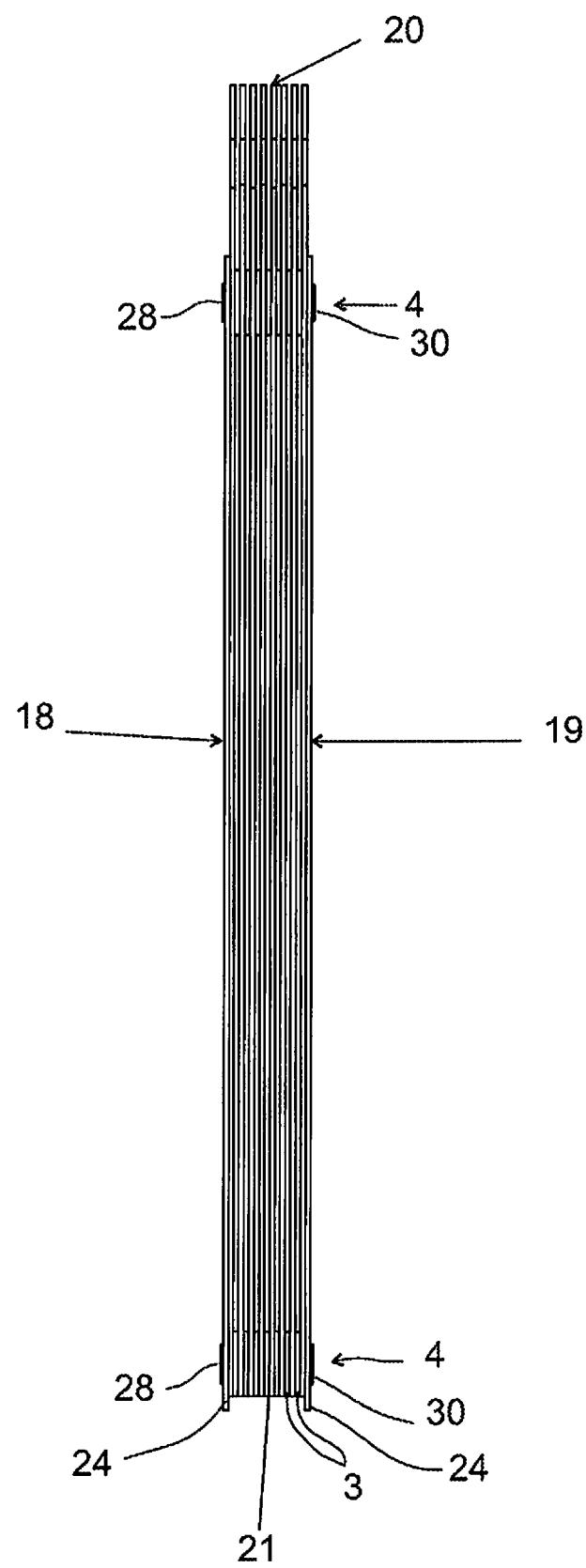
FIG. 3 shows the electrode module shown in FIG. 1 as shown from the first side face.
Figure 4:
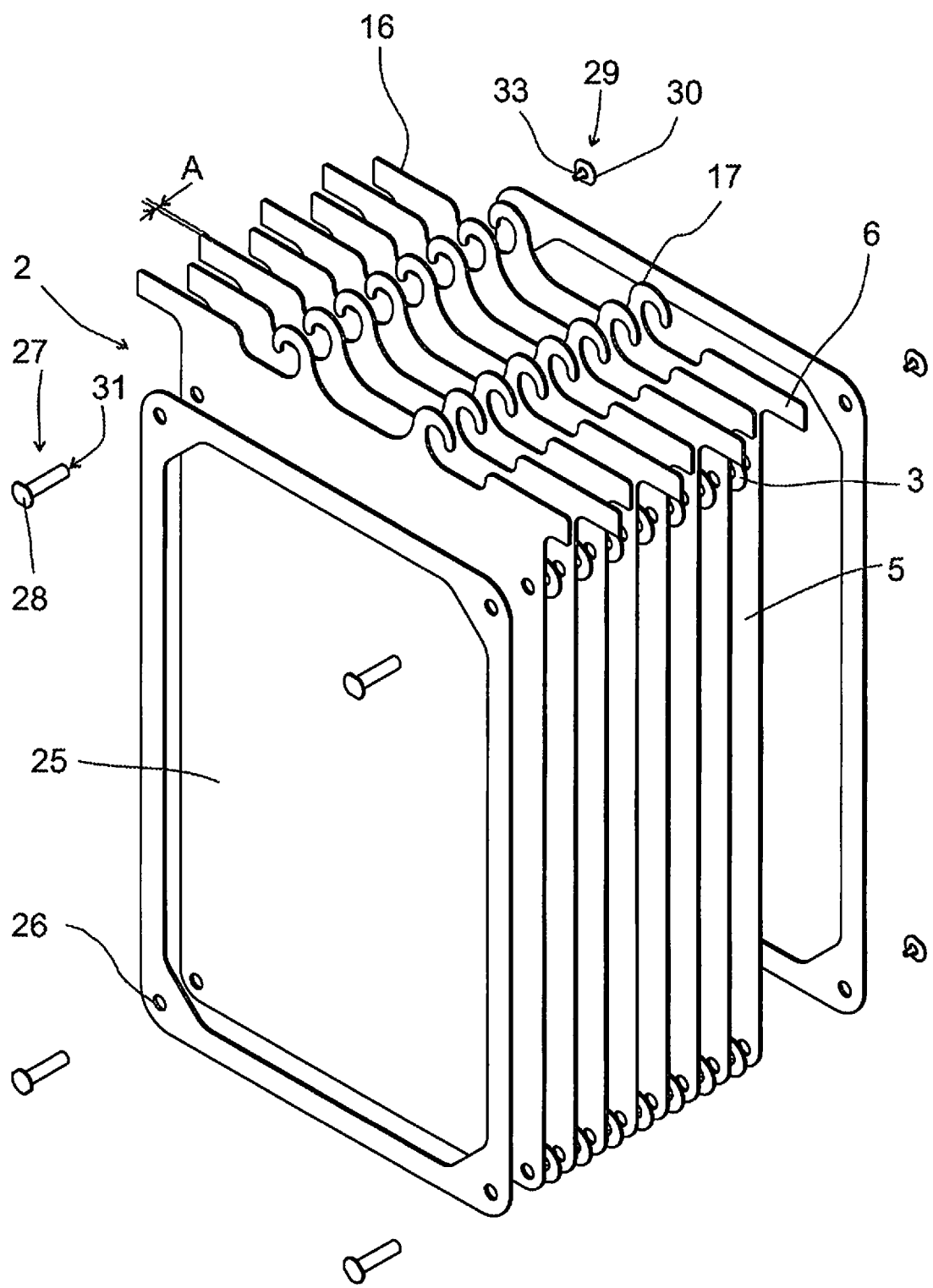
FIG. 4 shows the electrode module shown in FIG. 1 in exploded view.
Figure 5:
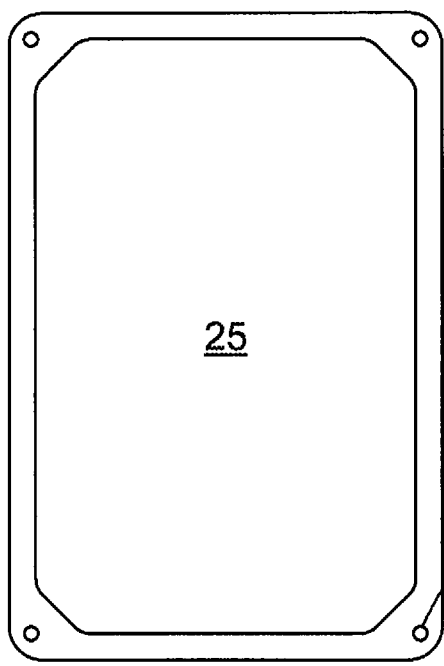
FIG. 5 shows a spacing frame of the electrode module shown in FIG. 1.
Figure 6:
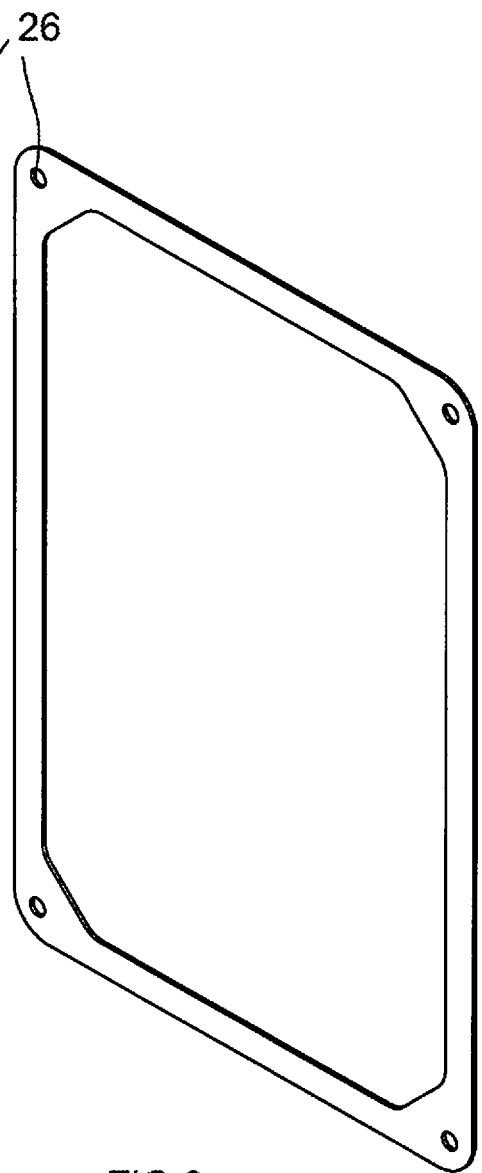
FIG. 6 shows a spacing frame of the electrode module shown in FIG. 1.
Figure 7:
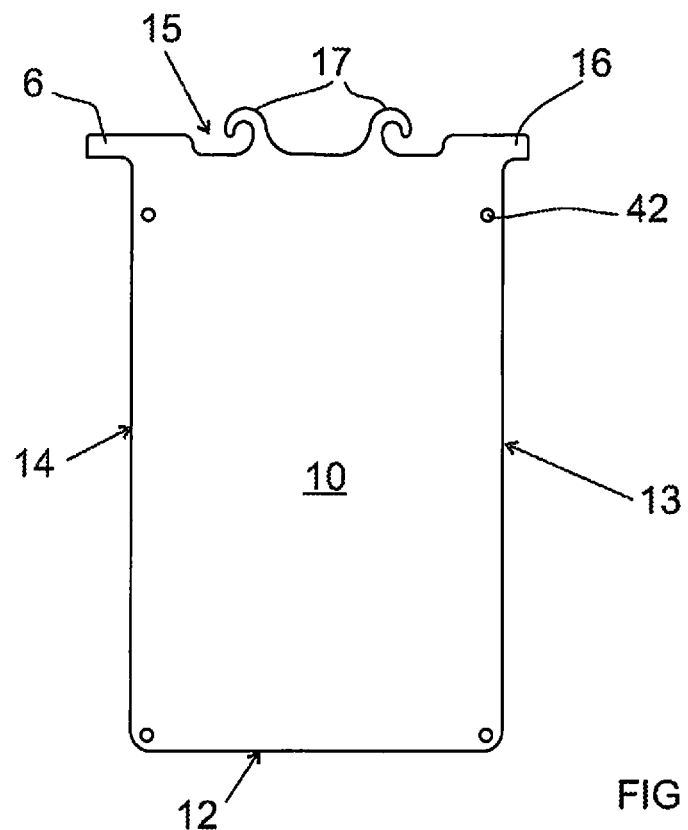
FIG. 7 shows an electrode plate of the electrode module shown in FIG. 1 as shown from a first plate face of the electrode plate.
Figure 8:
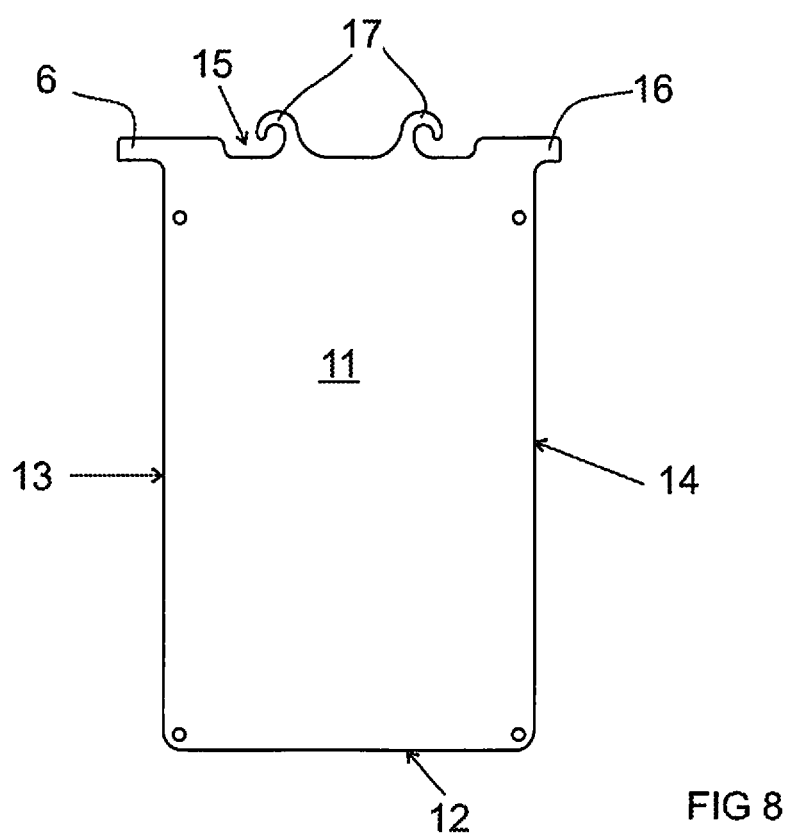
FIG. 8 shows an electrode plate of the electrode module shown in FIG. 1 as shown from a second plate face of the electrode plate.
Figure 9:
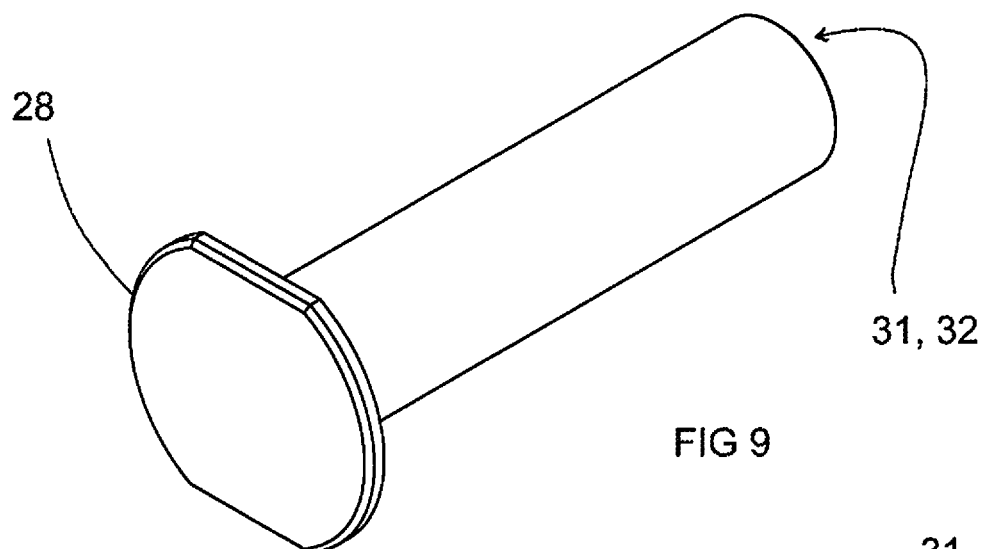
FIGS. 9, 10 and 11 show a first support member part of the electrode module shown in FIG. 1, FIGS. 12, 13 and 14 show a second support member part of the electrode module shown in FIG. 1.
Figure 10:
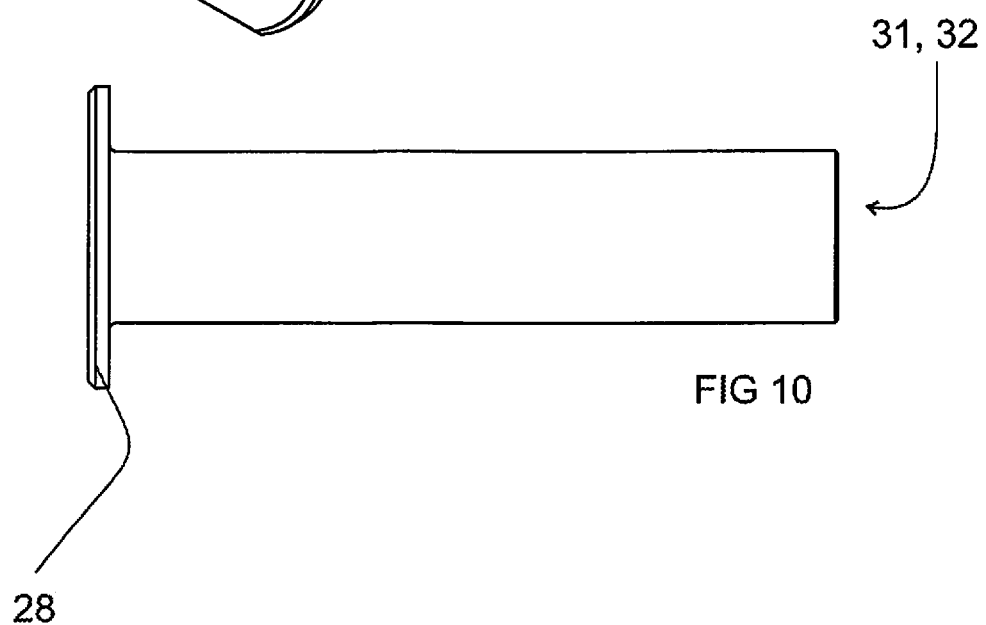
Figure 11:
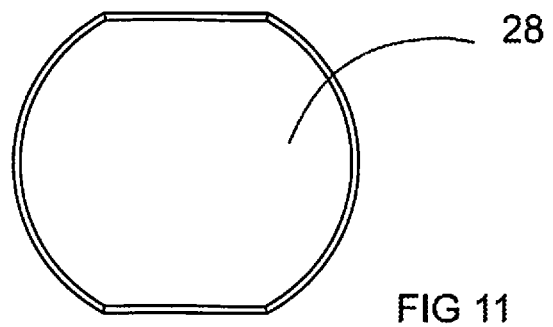
Figure 12:
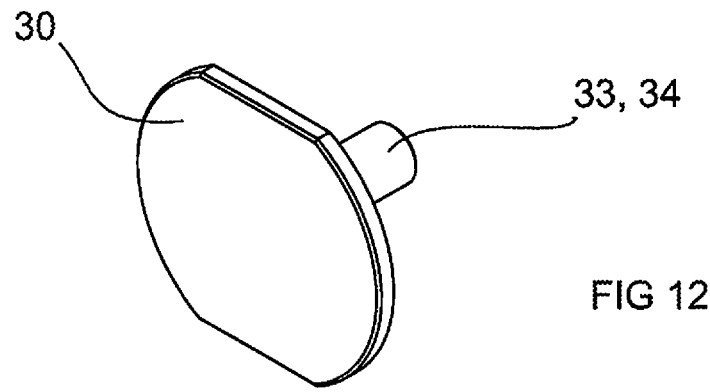
Figure 13:
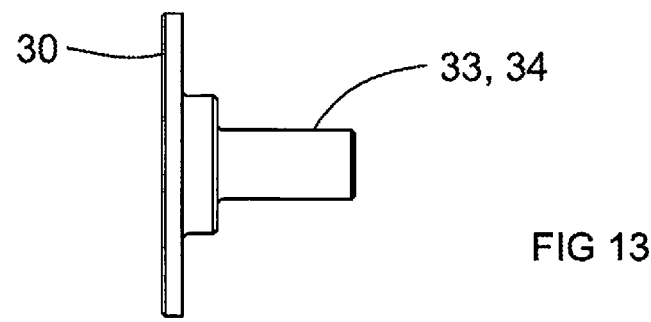
Figure 14:
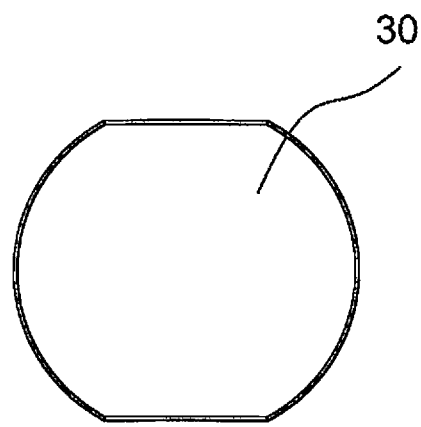

The invention relates to an electrode module 1 comprising a plurality of electrode plates 2 spaced from one another by means of spacing means 3 and alternately form, in use of the electrode module 1, an anode and a cathode in the electrode module 1.

The electrode module 1 comprises a plurality of support members 4 each extending through each electrode plate 2 such as through apertures 42 in each electrode plate 2 and at least one spacing means 3 between two adjacent electrode plates 2 for releasable securing said plurality of electrode plates 2 together.

Each electrode plate 2 comprise a plate portion 5.

Each electrode plate 2 comprise one supporting and connection lug portion 6 configured to support each electrode plate 2 of the electrode module 1 at one of a first busbar 7 and a second busbar 8 in an electrochemical reactor (EC reactor) 9 for electrically connecting each electrode plate 2 of the electrode module 1 with one of the first busbar 7 and the second busbar 8 for supplying electrical current between one of the first busbar 7 and the second busbar 8 and each electrode plate 2 of the electrode module 1.

The first busbar 7 can be connected to ground or to an electrical power source (not shown in the figures). The second busbar 8 can be connected to ground or to an electrical power source (not shown in the figures), however so, that an electrical potential difference is configured to be created between the first busbar 7 and the second busbar 8.

The electrode module 1 comprise a plurality of electrode plates 2, i.e. at least two electrode plates 2. The electrode module 1 can for example comprise between 4 and 11 electrode plates 2, preferably between 5 and 11 electrode plates 2, more preferably between 6 and 10 electrode plates 2, even more preferably between 7 and 9 electrode plates 2, such as 8 electrode plates 2.

In the electrode module 1, the supporting and connection lug portion 6 of every second electrode plate 2 extend preferably, but not necessarily, in a first direction that is opposite to a second direction in which the rest of the supporting and connection lug portions 6 extend.

In the electrode module 1, the at least two electrode plates 2 have preferably, but not necessarily, identical outer dimensions. Alternatively, all electrode plates 2 in the electrode module 1 can have individual outer dimensions i.e. each electrode plate 2 in the electrode module 1 can have outer dimensions diverging from the outer dimensions of the other electrode plates 2 in the electrode module. Alternatively, all electrode plates 2 in the electrode module 1 can have identical outer dimension.

A thickness A of each electrode plate 2 in the electrode module 1 is preferably, but not necessarily, between 2 and 20 mm, preferably between 3 and 10 mm, more between 5 to 7 mm, even more preferably about 6 mm.

The supporting and connection lug portion 6 of at least one electrode plate 2 in the electrode module 1 can be coated with a coating comprising at least one of nickel, gold silver, and copper to enhance the connection between said at least one electrode plate 2 and the first busbar 7 or the second busbar 8.

Said supporting and connection lug portion 6 is preferably, but not necessarily, seamlessly connected to the plate portion 5 of the electrode plate 2.

Said supporting and connection lug portion 6 is preferably, but not necessarily, an integrated part of the electrode plate 2.

Each electrode plate 2 have preferably, but not necessarily, a first plate face 10 and a second plate face 11 that is parallel with the first plate face 10, a bottom plate face 12, a first plate side face 13, and a second plate side face 14 that is parallel with the first plate side, and a top plate face 15. The supporting and connection lug portion 6 extends preferably, but not necessarily, from a corner between the first plate side face 13 and the top plate face 15 beyond the first plate side face 13 and the top plate face 15.

Each electrode plate 2 comprise preferably, but not necessarily, additionally a supporting lug portion 16 configured to support each electrode plate 2 of the electrode module 1 in an electrochemical reactor 9 without electrically connecting the supporting lug portion 16 to one of a first busbar 7 and a second busbar 8 in the electrochemical reactor 9. The supporting and connection lug portion 6 extends preferably, but not necessarily, from a corner (not marked with a reference numeral) between the second plate side face 14 and the top plate face 15 beyond the first plate side face 14 and the top plate face 15. The size of the supporting lug portion 16 is preferably, but not necessarily, smaller than the size of the supporting and connection lug portion 6 so at to enable supporting of each electrode plate 2 of the electrode module 1 in an electrochemical reactor 9 by means of the supporting lug portions 16 without electrical connection between the supporting lug portions 16 and one of a first busbar 7 and a second busbar 8. Said supporting lug portion 16 is preferably, but not necessarily, seamlessly connected to the plate portion 5 of the electrode plate 2.

Each electrode plate 2 comprise preferably, but not necessarily, additionally at least one lifting portion 17 such as a hook portion or a loop portion extending from the top plate face 15 on the electrode plate 2. Said at least one hook portion 17 is preferably, but not necessarily, seamlessly connected to the plate portion 5 of the electrode plate 2. Such hook portions 17 facilitates moving of the electrode module 1 to and from an electrochemical reactor 9.

Said plurality of electrode plates 2 of the electrode module 1 are preferably, but not necessarily, electrically insulated from each other within the electrode module 1. Electrical contact between said plurality of electrode plates 2 of the electrode module 1 is however enabled via a fluid for example liquid such as water surrounding the electrode module 1 when using the electrode module 1 in an electrochemical reactor 9.

The spacing means 3 are preferably, but not necessarily, made of electrically insulating material such as of polymer so as to prevent electrical connection between the electrode plates 2 of the electrode module 1, i.e so as to prevent electrical connection between the electrode plates 2 within the electrode module 1.

The electrode module 1 has preferably, but not necessarily, a first face 18, and a second face 19 on the opposite side of the electrode module 1 with respect to the first face 18. The electrode module 1 has preferably, but not necessarily, a top side face 20, a bottom side face 21, a first side face 22 between the first face 18 and the second face 19, and a second side face 23 between the first face 18 and the second face 19. The electrode module 1 has preferably, but not necessarily, a spacing frame 24 made of electrically insulating material such as of polymer at each of the first face 18 and the second face 19 of the electrode module 1. A purpose of the spacing frame 24 is to prevent electrical connection between two electrode modules 1 in an electrochemical reactor 9. Another purpose of the spacing frame 24 is to ensure correct spacing between two electrode modules 1 in an electrochemical reactor 9. Such spacing frame 24 comprises preferably, but not necessarily, an opening 25. The width of the spacing frame 24 corresponds preferably, but not necessarily, to the width of the plate portion 5 of an electrode plate 2. Each spacing frame 24 extends preferably, but not necessarily, beyond the bottom side face of the electrode module 1. The support members 4 extend preferably, but not necessarily, through holes 26 in the spacing frame 24. Another purpose of the spacing frame 24 is to prevent the electrode plates 5, when in use for example in an electrochemical reactor, from hitting and damaging for example a shell structure 35 of the electrochemical reactor 9.

In the embodiment of the electrode module 1 shown in the figures, each support member 4 comprises a first support member part 27 comprising a first enlarged section 28, and a second support member part 29 comprising a second enlarged section 30. The first support member part 27 comprise a female section 31 with an inner thread 32 and the second support member part 29 comprise male section 33 with an outer thread 34 configured to co-operate with the inner thread 32 of the female section 31 of the first support member part 27. In the embodiment of the electrode module 1 shown in the figures, said plurality of electrode plates 2 are arranged between the first enlarged section 28 of the first support member part 27 and the second enlarged section 30 of the second support member part 29 so as to secure said plurality of electrode plates 2 of the electrode module 1 together.

Said plurality of electrode plates 2 are preferably, but not necessarily, secured together with said plurality of support members 4 so that the electrode plates 2 can move with respect to each other in a direction along the plate portion 5 of each electrode plate 2 so as to ensure proper contact between the supporting and connecting lug portion 6 of each electrode plate 2 of the electrode module 1 and one of the first busbar 7 and the second busbar 8.

Each support member 4 is preferably, but not necessarily, made of insulating material, such as of polymer, so as to prevent electrical connection between the electrode plates 2 of the electrode module 1, i.e so as to prevent electrical connection between the electrode plates 2 within the electrode module 1. Alternatively, the outer surface of each support member 4 can be made of insulating material, such as of polymer, so as to prevent electrical connection between the electrode plates 2 of the electrode module 1, i.e so as to prevent electrical connection between the electrode plates 2 within the electrode module 1.

In the electrode module 1 at least one electrode plate 2 can be made of steel such as of carbon steel for example of stainless steel.

In the electrode module 1 at least one electrode plate 2 can be made of aluminum.

In the electrode module 1 at least one electrode plate 2 can be made of copper.

In the electrode module 1 at least one electrode plate 2 can be made of graphite.

In the electrode module 1 at least one electrode plate 2 can be made of titanium.

In the electrode module 1 at least one electrode plate 2 can be a platinum group metal (PGM) electrode or electrode coated with PGM.

In the electrode module 1 at least one electrode plate 2 can be made of graphite.

The width of the he electrode module 1 can be between 900 and 950 mm.

The height of the electrode module 1 can be between 1500 and 1600 mm.

The distance between two adjacent electrode plates 2 in the electrode module 1 in preferably, but not necessarily between 6 and 7 mm, preferably about 6.5 mm.

The invention relates also to an electrochemical reactor 9 comprising at least one electrode module 1 according to any embodiment as described above.

Figure 15:
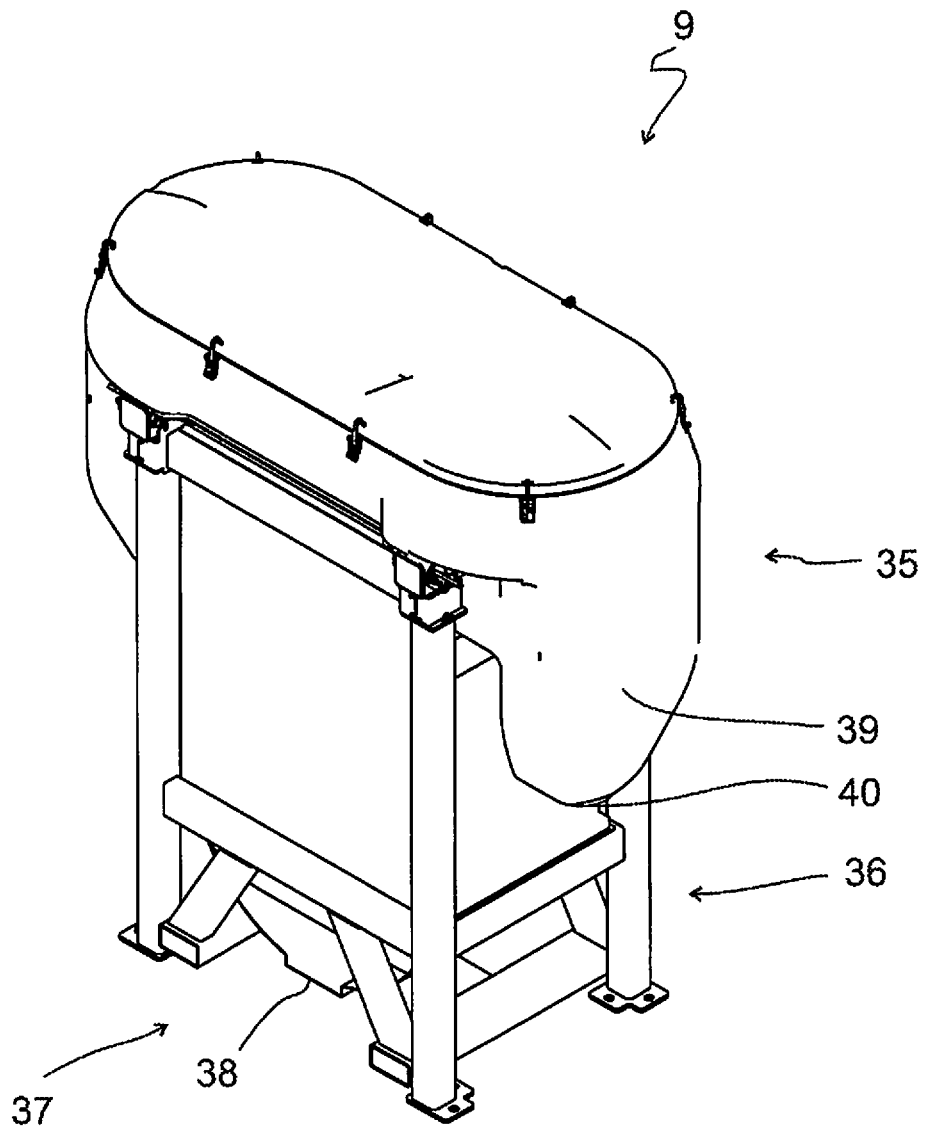
FIG. 15 shows an electrochemical reactor.
Figure 16:
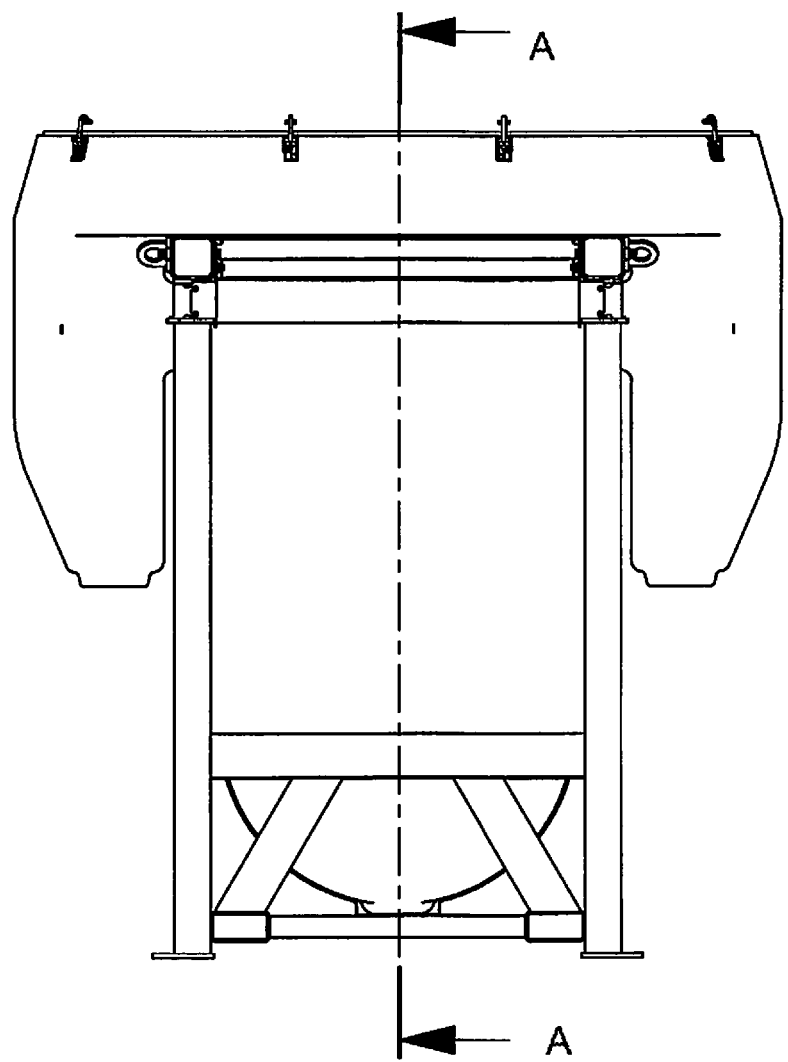
FIG. 16 shows the electrochemical reactor shown in FIG. 15 as seen from another angle.
Figure 17:
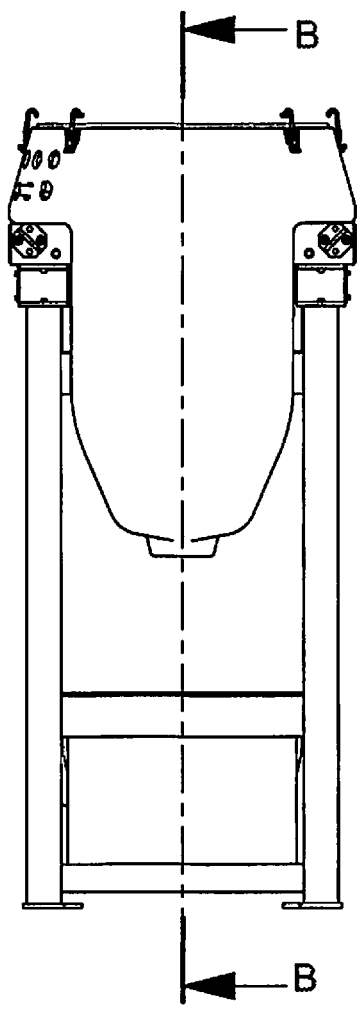
FIG. 17 shows the electrochemical reactor shown in FIG. 15 as seen from another angle.
Figure 18:
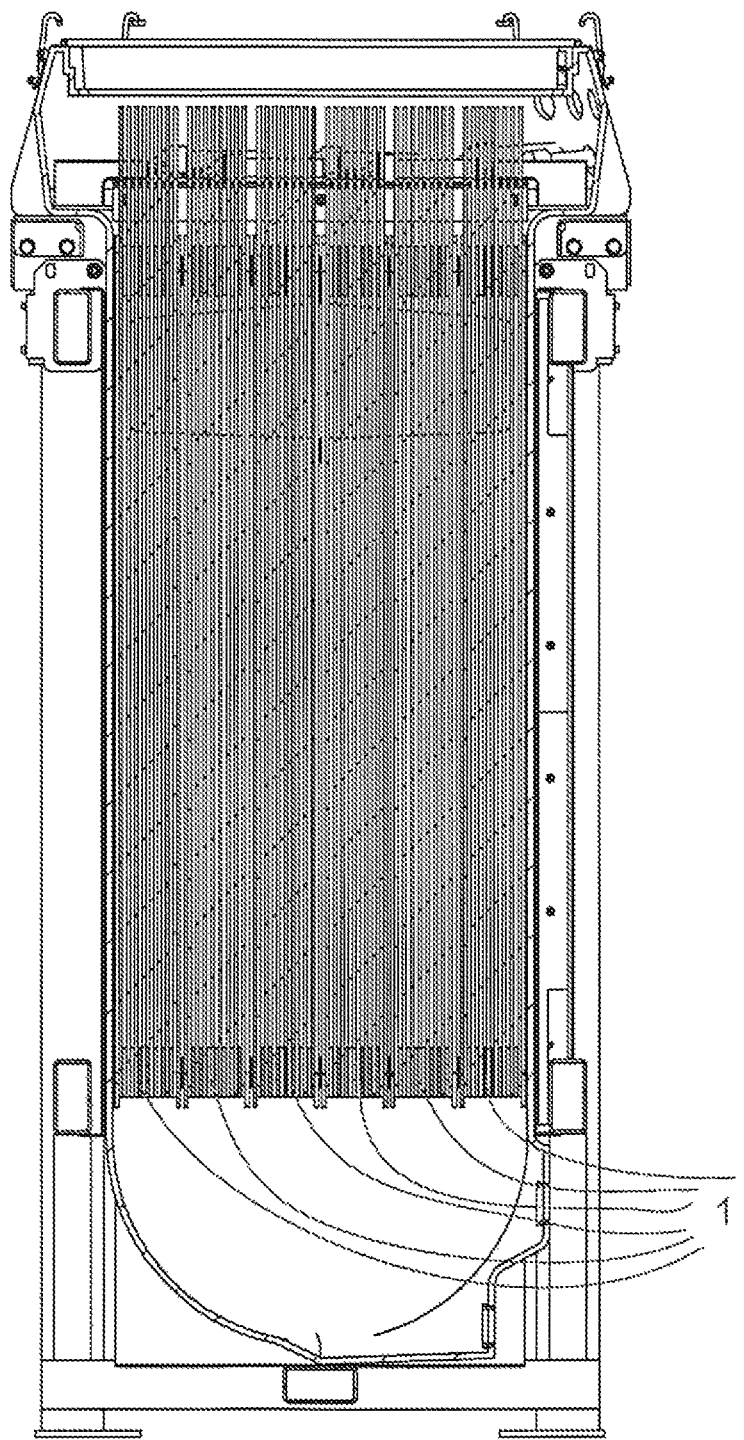
FIG. 18 shows the electrochemical reactor shown in FIG. 15 as cut along line A-A in FIG. 16.
Figure 19:
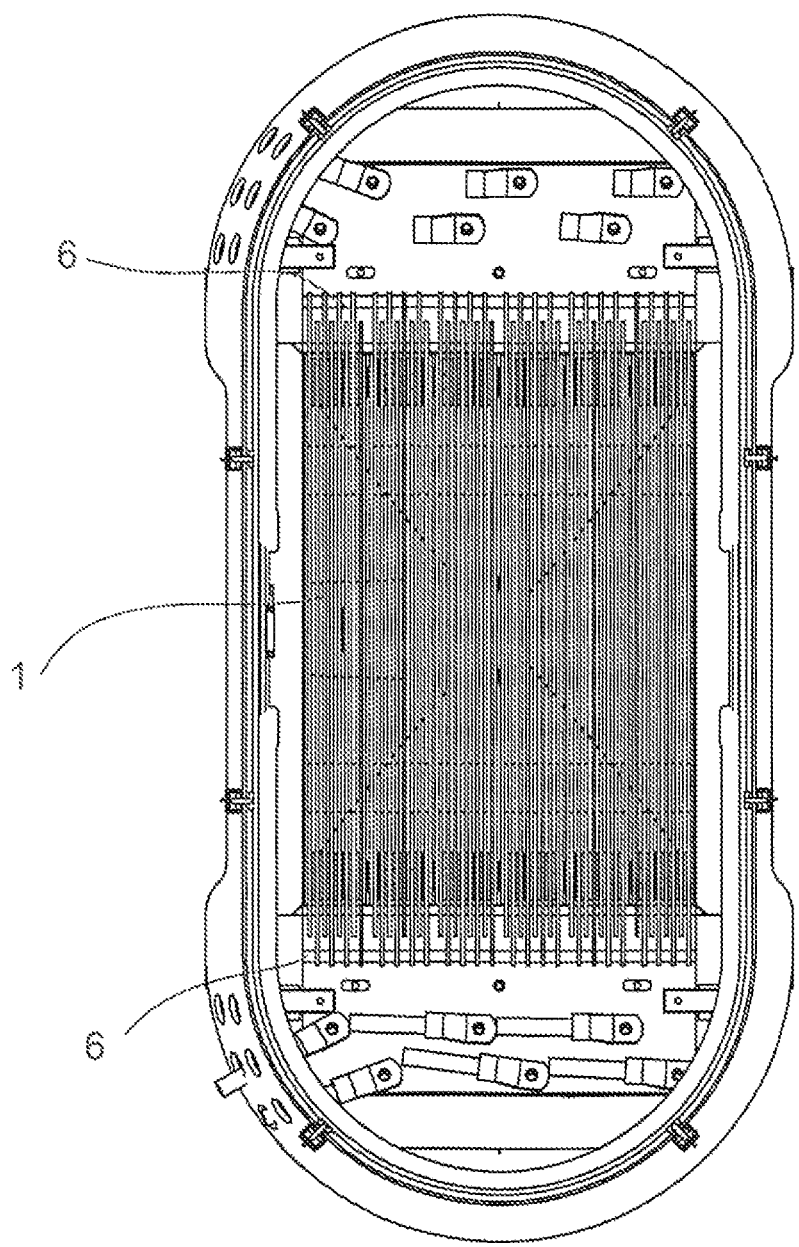
FIG. 19 shows from above the electrochemical reactor shown in FIG. 15 in a state where the cover has been removed.
Figure 20:
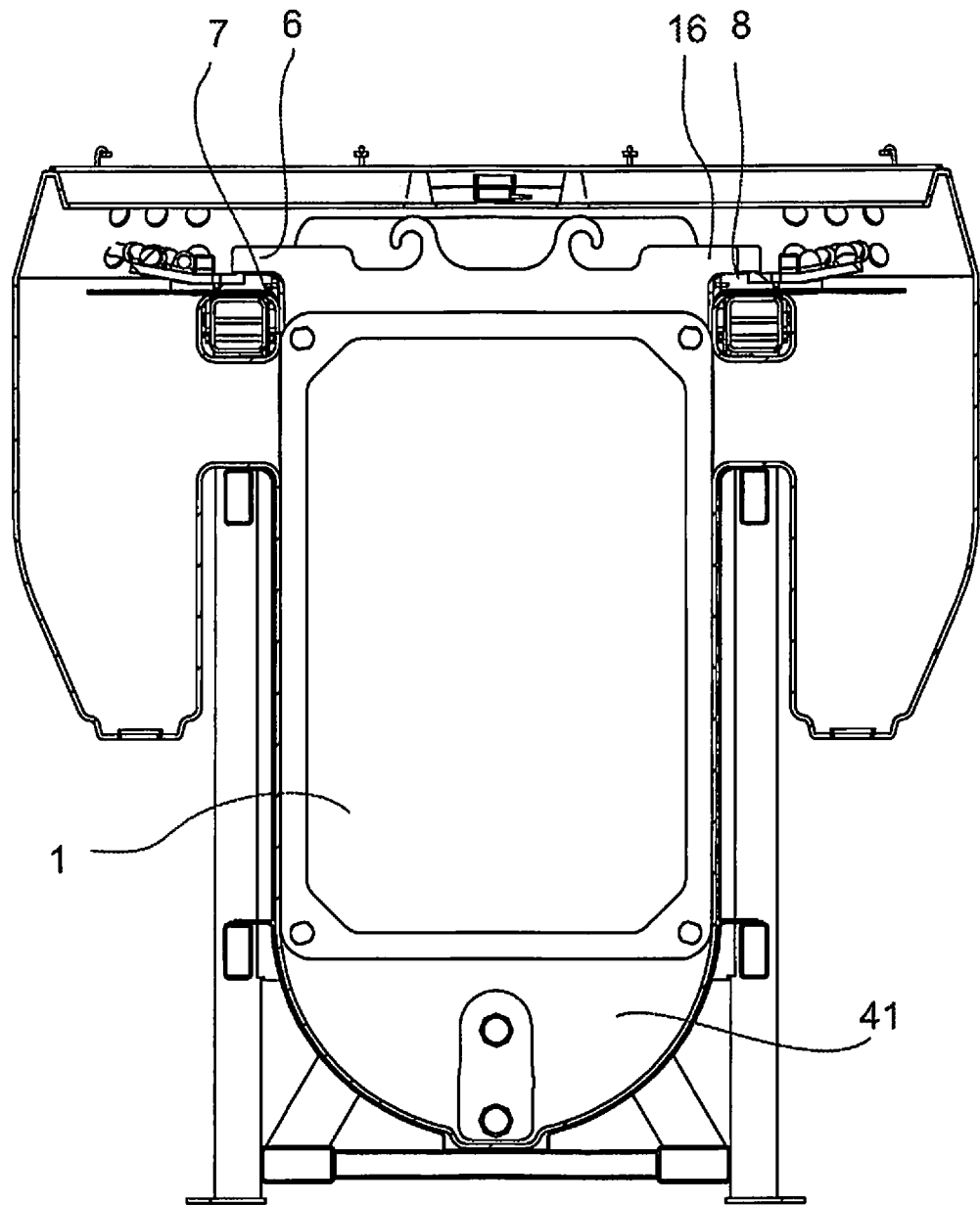
FIG. 20 shows the electrochemical reactor shown in FIG. 15 as cut along line B-B in FIG. 17.

FIGS. 15 to 20 shows an embodiment of an electrochemical reactor 9 comprising at least one electrode module 1 according to any embodiment as described above.

The electrochemical reactor 9, may as show in FIGS. 15 to 20, comprise a shell structure 35 and a support structure 36 for supporting the shell structure 35 on a base (not marked with a reference numeral).

The shell structure 35 of the electrochemical reactor 9 may, as show in FIGS. 15 to 20, define an inner space (nor marked with a reference numeral) and comprise an inlet portion 37 comprising an inlet 38 for conducting a water flow (not shown in the figures) into the inner space, an outlet portion 39 comprising an outlet 40 for conducting the water flow out of the inner space, a reactor chamber 41 in flow connection between the inlet portion 37 and the outlet portion 39 and in which reactor chamber 41 said at least one electrode module 1 according to any embodiment as described above is arranged.

The shell structure 35 of the electrochemical reactor 9, may as show in FIGS. 15 to 20, comprise a support portion 42 configured to support the shell structure 35 on the support structure 36.

The invention relates also to a water treatment apparatus comprising at least one electrode module 1 according to any embodiment as described above.

The invention relates also to the use of an electrode module 1 according to any embodiment as describe above in an apparatus or in a method for treating at least one of inorganic waste water such as mining and metals waste waters, electronics waste waters, chemical waste waters, car industry waste waters, and organic waste water such as food & beverage waste waters, textile and clothing waste waters, pulp and paper waste waters, domestic waste waters and agricultural waste waters.

The electrode module can for example be used for treating water originating from pulp and paper, chemical industry, electronic and car industry, and textile and clothing industry.

The electrode module can for example be used for domestic waste water treatment, municipal waste water treatment, and/or municipal drinking water treatment.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. An electrode module comprising:
a plurality of electrode plates spaced from one another by means of spacing means and alternately form an anode and a cathode;
a plurality of support members each extending through each electrode plate and at least one spacing means between two adjacent electrode plates for releasable securing said plurality of electrode plates together,
wherein each electrode plate comprises a plate portion,
wherein each electrode plate has a first plate face, a second plate face that is parallel with the first plate face, a bottom plate face, a first plate side face, a second plate side face that is parallel with the first plate side face, and a top plate face,
wherein each electrode plate comprises a first supporting and connection lug portion configured to support each electrode plate at one of a first busbar or a second busbar in an electrochemical reactor, the first supporting and connection lug portion electrically connecting each electrode plate with one of the first busbar or the second busbar for supplying electrical current between one of the first busbar or the second busbar and each electrode plate,
wherein the first supporting and connection lug portion of each electrode plate is seamlessly connected to the plate portion of the electrode plate,
wherein the first supporting and connection lug portion of each electrode plate extends from a corner between the first plate side face and the top plate face beyond the first plate side face and the top plate face,
wherein each electrode plate of the plurality of electrode plates of the electrode module is electrically insulated from each other within the electrode module,
wherein the electrode plates of the electrode module are in contact with fluid surrounding the electrode module, and
wherein each electrode plate in the electrode module is arranged in an alternating pattern such that the first supporting and connection lug portion of each successive electrode plate is disposed in opposing relation to the first supporting and connection lug portion of each previous electrode plate to alternately contact a respective one of the first and second busbar.

2. The electrode module according to claim 1 wherein the thickness of each electrode plate of the plurality of electrode plates is between 2 and 20 mm.

3. The electrode module according to claim 1, wherein the first supporting and connection lug portion of at least one electrode plate of the plurality of electrode plates is coated with a coating comprising at least one of nickel, gold, silver, or copper.

4. The electrode module according to claim 1, wherein each electrode plate of the plurality of electrode plates includes a second supporting lug portion configured to support each electrode plate of the plurality of electrode plates in an electrochemical reactor without electrically connecting the supporting lug portion to one of a first busbar and a second busbar in the electrochemical reactor.

5. The electrode module according to claim 1, wherein each electrode plate includes at least one lifting portion, the at least one lifting portion being a hook portion or a loop portion.

6. The electrode module according to claim 1, wherein the spacing means being made of electrically insulating material, the electrically insulating material being a polymer.

7. The electrode module according to claim 1, wherein the electrode module comprises a first face and a second face on the opposite side of the electrode module with respect to the first face.

8. The electrode module according to claim 7, wherein the electrode module comprises a spacing frame made of electrically insulating material at each of the first face and the second face of the electrode module, the electrically insulating material being a polymer.

9. The electrode module according to claim 8, wherein an opening is formed in the spacing frame.

10. The electrode module according to claim 8, wherein the support members extend through holes defined in the spacing frame.

11. The electrode module according to claim 1, wherein
each support member comprises a first support member part comprising a first enlarged section and a second support member part comprising a second enlarged section,
wherein the first support member part comprises a female section with an inner thread and the second support member part comprises a male section with an outer thread configured to co-operate with the inner thread of the female section of the first support member part, and
wherein the plurality of electrode plates is arranged between the first enlarged section of the first support member part and the second enlarged section of the second support member part so as to secure the plurality of electrode plates of the electrode module together.

12. The electrode module according to claim 1, wherein each electrode plate of the plurality of electrode plates is secured together in the electrode module with the plurality of support members so that the each electrode plate of the plurality of electrode plates can move with respect to each other in a direction along the plate portion of each electrode plate of the plurality of electrode plates.

13. The electrode module according to claim 1, wherein each support member is made of insulating material, the insulating material being a polymer.

14. The electrode module according to claim 1, wherein the outer surface of each support member is made of an insulating material, the insulating material being a polymer.

15. The electrode module according to claim 1, wherein at least one electrode plate of the plurality of electrode plates is formed from carbon steel.

16. The electrode module according to claim 1, wherein at least one electrode plate of the plurality of electrode plates is formed from aluminum.

17. The electrode module according to claim 1, wherein at least one electrode plate of the plurality of electrode plates is formed from copper.

18. The electrode module according to claim 1, wherein at least one electrode plate of the plurality of electrode plates is formed from graphite.

19. An electrochemical reactor comprising:
an electrode module according to claim 1.

20. A water treatment apparatus comprising:
an electrode module according to claim 1.

21. The electrode module according to claim 4, wherein the first supporting and connection lug portion extends a distance from the electrode plate that is greater than a distance the second supporting and connection lug portion extends from the electrode plate.

\* \* \* \* \*